United States Patent [19]
Melde-Tuczai

[11] Patent Number: 5,575,359
[45] Date of Patent: Nov. 19, 1996

[54] BRAKING DEVICE FOR MEASURING THE TORQUE OF AN ENGINE

[75] Inventor: Helmut Melde-Tuczai, Graz, Austria

[73] Assignee: AVL Gesellschaft für Verbrennungskraftmaschinen und Messtechnik mbH. Prof. Dr. Dr. h.c. Hans List, Graz, Austria

[21] Appl. No.: 513,515

[22] Filed: Aug. 10, 1995

[30] Foreign Application Priority Data

Aug. 18, 1994 [AT] Austria ..................................... 250/94

[51] Int. Cl.$^6$ ........................................................ B60L 7/00
[52] U.S. Cl. ...................... 188/158; 188/181 T; 73/862.18
[58] Field of Search ................................. 188/181 T, 158, 188/1.11; 303/112; 73/862.08, 862.17, 862.18, 117.3, 462, 116, 862.28, 862.29, 131

[56] References Cited

U.S. PATENT DOCUMENTS

| | | | |
|---|---|---|---|
| 3,789,659 | 2/1974 | Haldeman | 73/862.17 |
| 3,978,718 | 9/1976 | Schorsch | 73/117.3 |
| 4,110,670 | 8/1978 | Araki et al. | 188/158 |
| 4,150,566 | 4/1979 | Loebel et al. | 73/862.328 |
| 4,457,182 | 7/1984 | McFarland | 73/862.18 |
| 4,478,090 | 10/1984 | McFarland | 73/862.18 |
| 4,995,139 | 2/1991 | Suzuki | 73/116 |
| 5,400,876 | 3/1995 | Duncan | 188/158 |
| 5,469,741 | 11/1995 | Scourtes et al. | 73/462 |
| 5,490,584 | 2/1996 | Estaque et al. | 188/158 |

*Primary Examiner*—Douglas C. Butler
*Attorney, Agent, or Firm*—Watson Cole Stevens Davis, P.L.L.C.

[57] ABSTRACT

An electric braking device for measuring the torque of an engine includes a rotor rotating with a shaft and a stator which is tiltably supported in a housing by a bearing at either of its front ends, each end being provided with a disk-shaped bearing shield with a pivot journal. To prevent the measured results from being influenced by the stator bearings hydrostatic swivel bearings are used, one being axially movable and the other axially immovable. Each hydraulic swivel bearing includes a ring slipped over a pivot journal of the bearing shield the ring being supported by two bearing bodies secured against rotating, the latter being located one on either side of a longitudinal center plane containing the shaft axis and below a transverse plane containing the shaft axis and being normal to the center plane. Each bearing body includes a bearing pad and a supporting body permanently attached to the housing, the bearing pad is tiltably supported by the supporting body, and the ring of the axially immovable bearing is supported by the bearing pad so as to be secured against axial shifting.

5 Claims, 4 Drawing Sheets

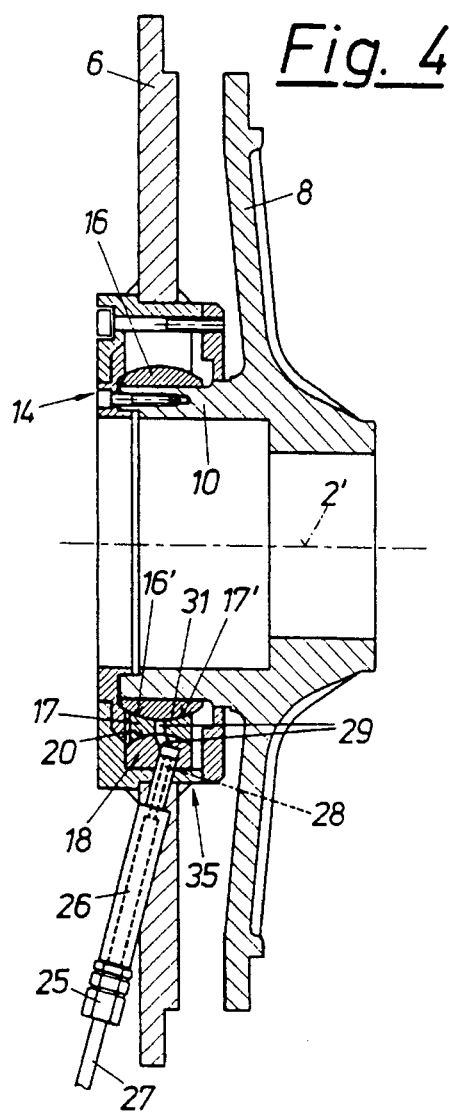
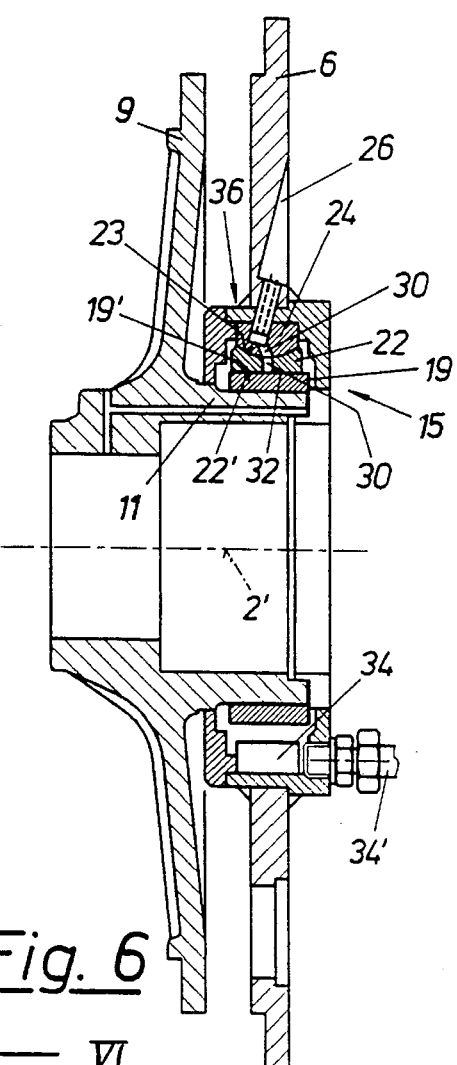
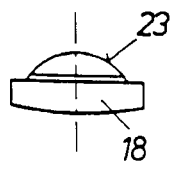
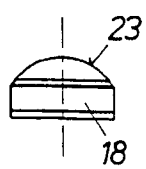
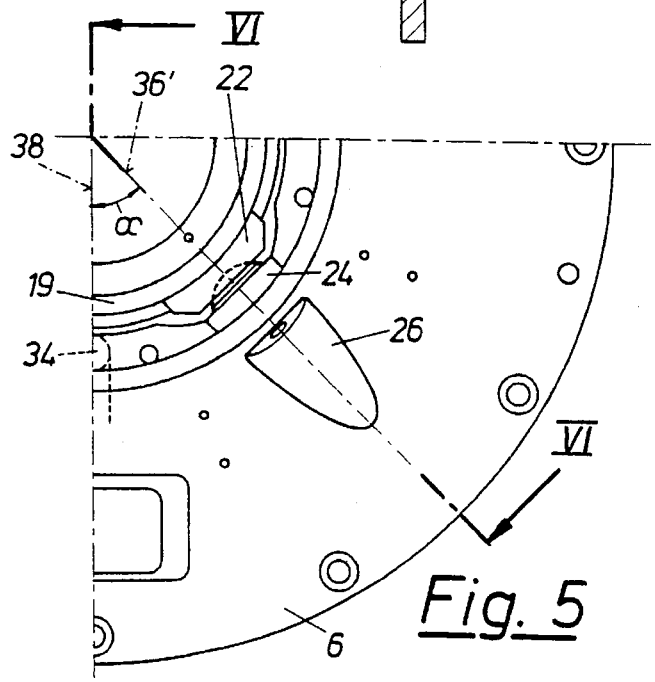

BRAKING DEVICE FOR MEASURING THE TORQUE OF AN ENGINE

BACKGROUND OF THE INVENTION

The invention relates to an electric braking device for measuring the torque of an engine, the device including a rotor rotating with a shaft and a stator which is tiltably supported in a housing by a bearing at either of its front ends, each end being provided with a disk-shaped bearing shield with a pivot journal.

DESCRIPTION OF THE PRIOR ART

In order to measure the torque of an engine by means of an electric braking device, the moment of reaction is determined with the use of a lever arm and a load cell. In electric brakes of a known kind, the stator of the brake is suspended in the housing by means of roller bearings permitting a swivel movement.

To prevent wobbling, the roller bearings should not be allowed any play. This is usually achieved by preloading them axially. The axial load produces a friction component, which manifests itself as hysteresis loss in torque measurement. To reduce such losses hydrostatic bearings have been used before as swivel bearings.

Known types of bearings comprise two rings, the outer one being fixed and the inner one floating. A pin with considerable play is provided to keep the rings from turning excessively.

Axial forces are taken up by the floating ring chafing against the parts of the housing. This will produce more friction, which may influence the measured result in turn.

Moreover, the gaps of such bearings are smaller below than above due to the large weight of the inner engine (rotor and stator) or the entire brake (rotor, stator, housing).

For this reason a larger quantity of oil will seep from the upper region of each bearing than from the lower, so that more oil is used than would be necessary.

Other known types of braking devices have hydraulic pads that cannot take up any axial forces. In these instances the axial forces are simply passed on to the housing by means of a prismatic body dipping into an oil bath. Again, the measured result will be obscured by the frictional component.

SUMMARY OF THE INVENTION

It is an object of the invention to avoid such disadvantages and to improve a braking device of the above type in such a way as to make the measured result largely independent of the bearing system.

It is another object of the invention to reduce the amount of lubricating oil required.

In the invention this is achieved by using hydrostatic swivel bearings, one of the two being axially movable and the other one axially immovable, and each of them comprising a ring slipped over the pivot journal of the bearing shield, which ring is supported by two bearing bodies secured against rotating, the latter being located one on either side of a longitudinal center plane containing the shaft axis and below a transverse plane containing the shaft axis and being normal to the longitudinal center plane. Each bearing body includes a bearing pad and a supporting body permanently attached to the housing, and the bearing pad is tiltably supported by the supporting body, and the ring of the axially immovable bearing is supported by the bearing pad so as to be secured against axial shifting. The stator is thus supported against the housing only by means of the two bearing bodies. For this reason lubrication of the bearing is only necessary in this area.

It is provided in a preferred variant that the bearing surface between bearing pad and supporting body is configured as spherical cap. In this way the bearing pads are supported on the supporting bodies so as to be tiltable, and the bearing gap between ring and bearing body is automatically adjusted to uniform width.

No separate axial stop is needed if the outer surface of the ring of the axially immovable bearing is at least partly torus-shaped and cooperates with a contact surface of the bearing pad that is shaped correspondingly. The ring of the axially immovable bearing and the bearing bodies cooperating with this ring are self-centering, so that no axial stop will be required. In the instance of thermal expansions of the inner engine the latter can move freely with no additional axial forces arising.

The stator is axially movable vis-a-vis the housing by diving the outer surface of the ring of the axially movable bearing as well as the contact surface of the bearing pad a cylindrical shape.

In further development of the invention it is provided that the bearing gaps between ring and bearing pad be connected with a connection for pressurized oil via passages in the bearing pad and the supporting body and via a throttling port. In this way the lubricating oil can be precisely metered and fed to the bearing surfaces as required.

BRIEF DESCRIPTION OF THE DRAWINGS

Following is a more detailed description of the invention as illustrated by the accompanying drawings FIG. 4 is a section through the axially immovable bearing along line IV—IV in FIG. 3, FIG. 5 is a partial view of an axially movable bearing as described by the invention, FIG. 6 a section of an axially movable bearing along line VI—VI in FIG. 5, and FIGS. 7 and 8 are detailed views of a supporting body of a bearing as described by the invention. In FIG. 4 one bearing body is rotated downwards by approx. 45°, in FIG. 6 the other one is rotated upwards by approx. 135°, into the plane of the section.

DETAILED DESCRIPTION OF THE PREFERRED EMBODIMENT

Figure 1:
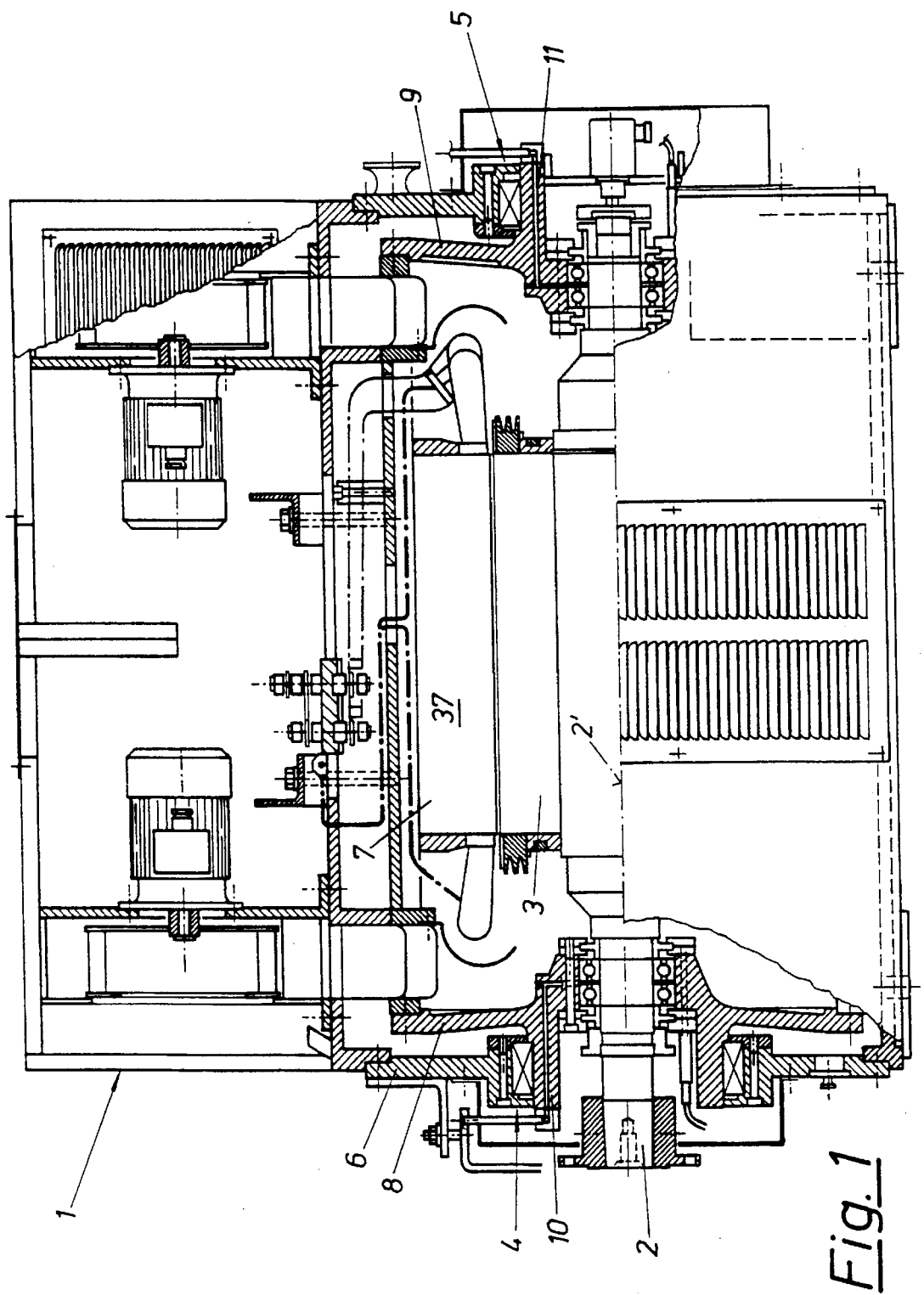
FIGS. 1 and 2 show partially broken away side and front end views of an electric braking device.

FIG. 1 shows a longitudinal view of an electric braking device. The device 1 comprises a rotor rotating with a shaft 2, and a stator 7 supported in the housing 6 by bearings 4, 5, which are drawn schematically. At its front ends the stator 7 is provided with disk-shaped bearing shield 8, 9 bearing pivot journals 10, 11, which are supported by the housing G by bearings 4, 5.

Figure 2:
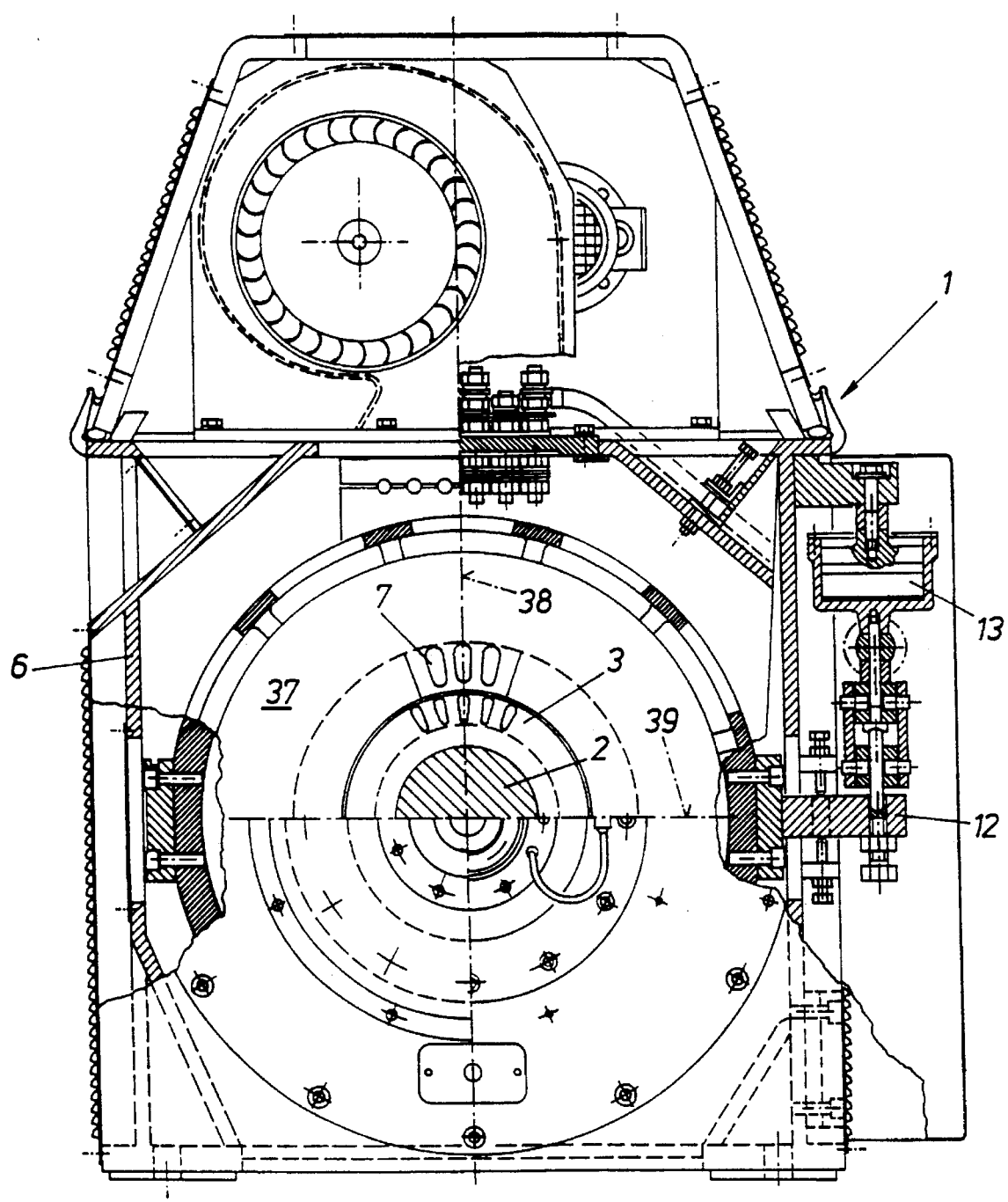

As is seen in FIG. 2, the stator is connected to a load cell 13 via a lever arm 12 for the purpose of torque measurement.

In conventional devices bearings 4, 5 are roller bearings.

In the invention the stator 7 is supported by hydraulic swivel bearings, one swivel bearing 4 being configured as an axially immovable bearing 14, and the other swivel bearing 5 as an axially movable bearing 15.

Figure 3:
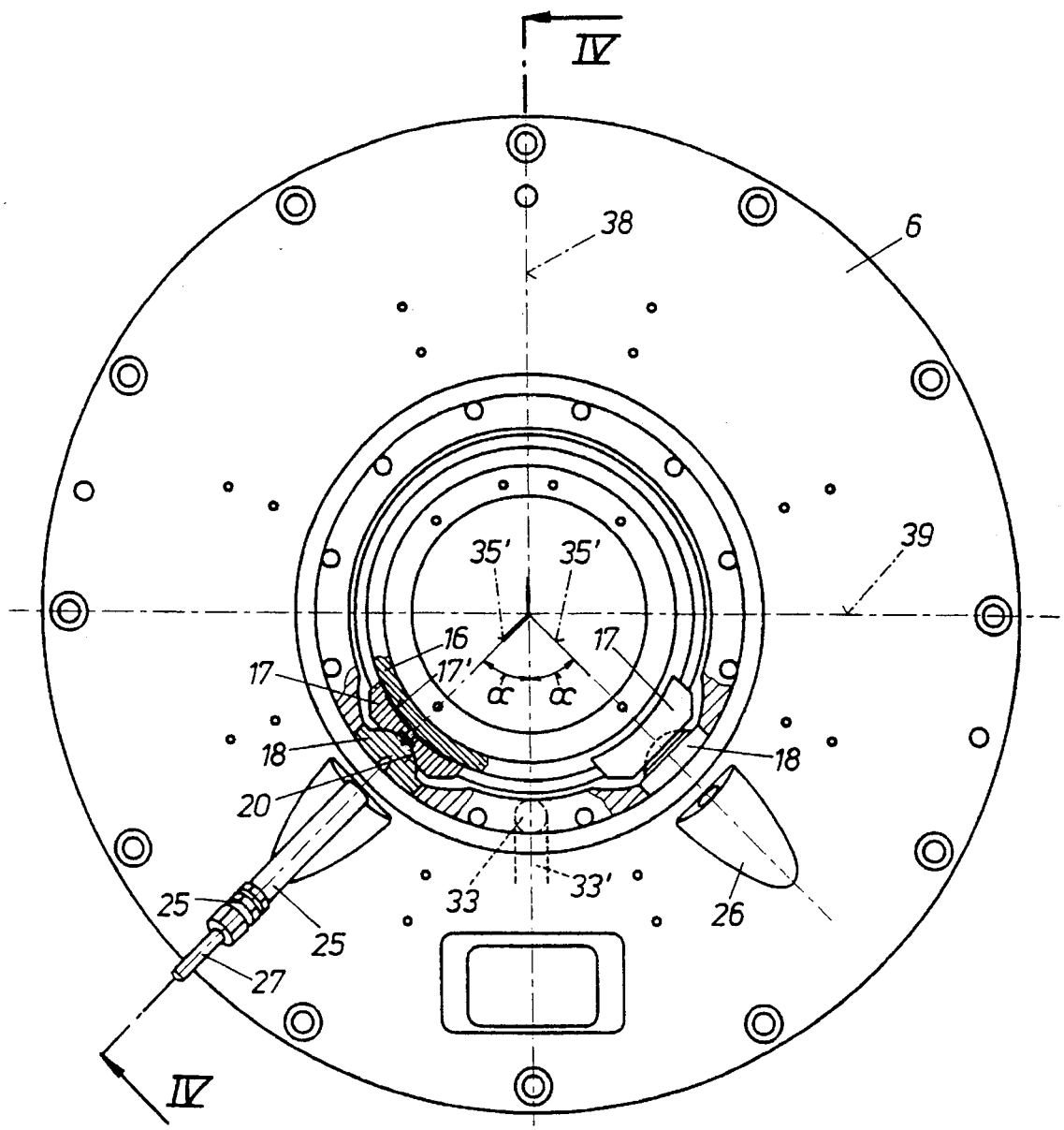
FIG. 3 is a front view of an axially immovable bearing as described by the invention.

As is shown in FIGS. 3 and 4, the axially immovable bearing 14 is provided with a ring 16 slipped over the pivot journal 10 of the bearing shield 8, the contact surface 16' of this ring being configured as part of a torus. Via the surface 16' the ring 16 is in contact with correspondingly shaped contact surfaces 17' of two bearing pads 17, which are supported by the housing 6 of the braking device 1 by means of a supporting body 18 each. Bearing pad 17 and supporting body 18 together form the bearing body 35. Each supporting body 18 has a surface 20 configured as spherical cap on which the bearing pad 17 can align itself so as to be tiltable in all directions.

Like the axially immovable bearing 14, the axially movable bearing 15 shown in FIGS. 5 and 6 has a ring 19 slipped over the pivot journal 11 of the bearing shield 9. The ring 19 is cylindrical in shape, however, cooperating with cylindrical contact surfaces 22' of the bearing pads 22 configured as cylinders. The bearing pads 22 are supported via spherical caps 23 on supporting bodies 24 permanently attached to the housing 6, and are self-aligning by being tiltable in all directions. In the instance of thermal expansions of the inner engine 37, i.e., rotor 3 and stator 7, vis-a-vis the housing 6, the former may move freely with no additional axial forces arising.

Any exterior axial forces are taken up by the axially immovable bearing 14 via the toroidal ring 16, the bearing pads 17, and the supporting bodies 18 at the housing 6.

A plane 35' or 36', which is defined by the shaft axis 2' and the bearing bodies 35 or 36, forms an angle alpha of approximately 45° with the longitudinal center plane 38. The bearing bodies 35, 36 are located one on either side of longitudinal center plane 38 containing shaft axis 2' and below transverse plane 39 containing the shaft axis 2', the plane 39 being transverse to plane 38.

The supporting bodies 18 and 24 are fastened to the housing 6 by screws 25.

The screws 25 max serve as oil connections 26 at the same time. The pressurized oil is fed via an oil connection 26 from an oil pressure system (not shown in detail) through the pipes 27, via a throttle 28 and oil passages 29, 30 in the supporting bodies 18, 24 and the bearing pads 17, 22, to the bearing gaps 31, 32. The oil seeping from the bearing gaps 31, 32 is collected at the lowest point in the housing 6, and is drained from the axially immovable bearing 14 and the axially movable bearing 15, respectively, via an oil drain 33, 34, and a pipe 33', 34'. Providing a throttle 28 in each screw 25 will ensure that all four bearing gaps 31, 32 are evenly supplied with oil.

The contact surfaces 16', 19', 17', 22' between rings 16 and 19, respectively, and bearing pads 17 and 22, respectively, essentially make up the hydrostatic bearings. The load and oil flow through the bearing gaps 31 and 32 will generate a certain oil pressure in the bearing pads 17 and 22. Depending on the particular load, the bearing gap 31, 32 will become larger or smaller, diminishing or increasing the pressure correspondingly.

As the bearing pads 17 and 22 are tiltably supported on the supporting bodies 18 and 24, the bearing gaps 31 and 32 at the rings 16 and 19, respectively, are automatically adjusted to uniform width.

I claim:

1. An electric braking device for measuring torque of an engine comprising: a housing, a rotor rotating with a shaft which extends through said housing, and a stator tiltably supported in said housing by a bearing at either of front ends thereof, each of said front ends being provided with a disk-shaped bearing shield with a pivot journal, wherein said bearings comprise hydrostatic swivel bearings, a first of said hydrostatic swivel bearings being an axially movable bearing and a second of said hydrostatic swivel bearings being an axially immovable bearing, each of said bearings comprising a ring slipped over a pivot journal of a respective said bearing shield, said ring being supported by two bearing bodies secured against rotating, said bearing bodies being located one on either side of a longitudinal center plane containing a shaft axis and below a transverse plane containing the shaft axis and which is normal to said longitudinal center plane, each bearing body comprising a bearing pad and a supporting body permanently attached to the housing, each bearing pad being tiltably supported by a supporting body, and the ring of the axially immovable bearing being supported by the bearing pad so as to be secured against axial shifting.

2. Braking device as in claim 1, wherein a bearing surface between bearing pad and supporting body is configured as spherical cap.

3. Braking device as in claim 1, wherein an outer surface of the ring of the axially immovable bearing is at least partly torus-shaped and cooperates with a correspondingly shaped contact surface of the bearing pad.

4. Braking device as in claim 1, wherein an outer surface of the ring of the axially movable bearing and a contact surface of the bearing pad have a cylindrical shape.

5. Braking device as in claim 1, including a respective connection means connected to bearing gaps of the bearings between rings and bearing pads for delivering pressurized oil via passages in the bearing pads and the supporting bodies, and via a throttling port.

* * * * *